(12) United States Patent
Williams et al.

(10) Patent No.: US 12,031,860 B2
(45) Date of Patent: Jul. 9, 2024

(54) PHOTOMETER

(71) Applicant: KONICA MINOLTA, INC., Tokyo (JP)

(72) Inventors: Yukitroy Williams, Osaka (JP); Yutaka Kadowaki, Sakai (JP)

( * ) Notice: Subject to any disclaimer, the term of this patent is extended or adjusted under 35 U.S.C. 154(b) by 0 days.

(21) Appl. No.: 18/019,231

(22) PCT Filed: Jul. 14, 2021

(86) PCT No.: PCT/JP2021/026393
§ 371 (c)(1),
(2) Date: Feb. 1, 2023

(87) PCT Pub. No.: WO2022/030201
PCT Pub. Date: Feb. 10, 2022

(65) Prior Publication Data
US 2023/0273067 A1    Aug. 31, 2023

(30) Foreign Application Priority Data

Aug. 3, 2020  (JP) ................. 2020-131729

(51) Int. Cl.
*G01J 1/04*    (2006.01)
(52) U.S. Cl.
CPC ........... *G01J 1/0414* (2013.01); *G01J 1/0403* (2013.01); *G01J 1/044* (2013.01)
(58) Field of Classification Search
CPC ........ G01J 1/0414; G01J 1/0403; G01J 1/044; G01J 1/02; G01J 3/02; G01J 3/0208; G01J 3/021; G01J 3/0232; G01J 3/027; G01J 3/0291; G03B 13/02; G03B 17/20
See application file for complete search history.

(56) References Cited

U.S. PATENT DOCUMENTS

| 3,740,147 A | * | 6/1973 | Kallet | ............... G02B 21/0096 |
| | | | | 359/387 |
| 3,813,172 A | * | 5/1974 | Walker | ................. G01J 1/0414 |
| | | | | 356/219 |
| 2005/0103979 A1 | | 5/2005 | Heigel | |
| 2012/0200694 A1 | | 8/2012 | Garsha et al. | |
| 2020/0326237 A1 | | 10/2020 | Yamamoto et al. | |

FOREIGN PATENT DOCUMENTS

| JP | 2005221651 A | 8/2005 |
| JP | 2012198119 A | 10/2012 |
| JP | 2013507612 A | 3/2013 |
| WO | 2017179520 A1 | 10/2017 |

OTHER PUBLICATIONS

International Search Report (ISR) (and English language translation thereof) dated Oct. 12, 2021, issued in International Application No. PCT/JP2021/026393.
Written Opinion (and English language translation thereof) dated Oct. 12, 2021, issued in International Application No. PCT/JP2021/026393.

* cited by examiner

*Primary Examiner* — Tony Ko

(57) ABSTRACT

A photometer includes a luminous flux splitter that splits a luminous flux incident from a single light receiving optical system and guides the luminous flux to a finder optical system and a photometric part. A light receiver is arranged at a position to receive at least a part of light split into the finder optical system by the luminous flux splitter and generates an output for light emission profile analysis according to a light reception result.

15 Claims, 3 Drawing Sheets

PHOTOMETER

TECHNICAL FIELD

The present invention relates to a photometer, and more particularly to a photometer capable of performing data acquisition for analyzing a light emission profile and photometry in parallel.

BACKGROUND ART

Conventionally, there has been known and used a method of arranging a light receiving sensor in a photometric system by a method of synchronizing frequencies, which is one of light emission profile analysis.

As one of them, Patent Literature 1 proposes a temporal source analysis method using an array detector in order to synchronize an imaging device of a temporally discontinuous illumination source.

CITATION LIST

Patent Literature

Patent Literature 1: US 2005/0103979 A

SUMMARY OF INVENTION

Technical Problem

However, in the method described in Patent Literature 1, since photometry and data acquisition for light emission profile analysis are performed while being switched, there is a problem that the photometry and the data acquisition cannot be performed in parallel and efficiency is poor.

The present invention has been made in view of such a technical background, and an object thereof is to provide a photometer capable of performing data acquisition for light emission profile analysis and photometry in parallel.

Solution to Problem

The above object is achieved by the following means.

(1) A photometer including a luminous flux splitting means that splits a luminous flux incident from a single light receiving optical system and to guide the luminous flux to a finder optical system and a photometric means, in which the photometer includes: a light receiving means arranged at a position for receiving at least a part of light split into the finder optical system by the luminous flux splitting means, that generates an output for light emission profile analysis according to a light reception result.

(2) The photometer according to the paragraph 1, including a half mirror that transmits a part of light split into the finder optical system by the luminous flux splitting means and to reflect remaining light to a finder eyepiece unit, in which the light receiving means is arranged at a position for receiving at least a part of light transmitted by the half mirror.

(3) The photometer according to the paragraph 1, in which the light receiving means is arranged at a position for receiving at least a part of light that is split into the finder optical system by the luminous flux splitting means and reaches the finder eyepiece unit, and there is provided a shutter that blocks reverse incident light from the finder eyepiece unit at a time of light reception by the light receiving means.

(4) The photometer according to the paragraph 3, in which the light receiving means is installed on the shutter, and there is provided a moving means that moves the shutter to a position for blocking the reverse incident light in accordance with a photometry timing by the photometric means.

(5) The photometer according to the paragraph 1, including: a light guide mirror movable between a standby position and a reflection/blocking position for reflecting at least a part of light that is split into the finder optical system by the luminous flux splitting means and reaches the finder eyepiece unit and for blocking reverse incident light from the finder eyepiece unit; and a moving means that moves the light guide mirror from the standby position to the reflection/blocking position at a time of light reception by the light receiving means, in which the light receiving means is arranged at a position for receiving at least a part of tight reflected by the light guide mirror moved to the reflection/blocking position.

(6) The photometer according to the paragraph 5, in which the moving means moves the light guide mirror to the reflection/blocking position in accordance with a photometry timing by the photometric means.

(7) The photometer according to the paragraph 1, including an electronic viewfinder that receives light split into the finder optical system by the luminous flux splitting means, in which the light receiving means is configured with the electronic viewfinder.

(8) The photometer according to any one of the paragraphs 1 to 7, in which the luminous flux splitting means is an aperture Mirror having an aperture in a center.

(9) The photometer according to any one of the paragraphs 1 to 8, in which the photometer is a spectroscopic device.

Advantageous Effects of Invention

According to the invention described in the paragraph (1), a luminous flux incident from the single light receiving optical system is split and guided to the finder optical system and the photometric means. The light receiving means is arranged at a position for receiving at least a part of light split into the finder optical system, and the light receiving means generates an output for light emission profile analysis according to a light reception result.

In this way, the light receiving means that generates an output for the light emission profile analysis is arranged at a position for receiving at least a part of light split into the finder optical system, and the light receiving means is not arranged on an optical path guided to the photometric means. Therefore, photometry and data acquisition for light emission profile analysis do not depend on each other, thus both can be performed in parallel, and efficiency can be improved.

According to the invention described in the paragraph (2), there is provided the half mirror that transmits a part of light split into the finder optical system by the luminous flux splitting means and to guide remaining light to the finder eyepiece unit, and the light receiving means is arranged at a position for receiving at least a part of the light transmitted by the half mirror. Therefore, it is possible to reliably realize a configuration in which the light receiving means is provided at a position for receiving at least a part of light split into the finder optical system.

According to the invention described in the paragraph (3), the light receiving means is arranged at a position for receiving a part of light that is split into the finder optical system and reaches the finder eyepiece unit. Further, reverse incident light from the finder eyepiece unit is blocked by the shutter at a time of light reception by the light receiving mans. Therefore, it is possible to reliably realize a configuration in which the light receiving means is provided at a position for receiving at least a part of light split into the finder optical system, and it is possible to prevent an adverse effect of reverse incident light from the finder eyepiece unit by the shutter at a time of light reception by the light receiving means.

According to the invention described in the paragraph (4), the shutter installed with the light receiving means is moved to a position for blocking reverse incident light in accordance with a photometry timing by the photometric means. Therefore, an output for light emission profile analysis can be acquired from the light receiving means in parallel with the photometry by the photometric means.

According to the invention described in the paragraph (5), at a time of light reception by the light receiving means, the light guide mirror moves from the standby position to the reflection/blocking position for reflecting at least a part of light that is split into the finder optical system and reaches the finder eyepiece unit and for blocking reverse incident light from the finder eyepiece unit, and the tight receiving means receives at least a part of light reflected by the light guide mirror. Therefore, it is possible to generate an output for light emission profile analysis from the light receiving means while blocking reverse incident light incident from the finder eyepiece unit with the light guide mirror and preventing adverse effects thereof.

According to the invention described in the paragraph (6), the light guide mirror is moved to the reflection/blocking position in accordance with a photometry timing by the photometric means, so that an output for light emission profile analysis can be acquired from the light receiving means in synchronization with the photometry by the photometric means.

According to the invention described in the paragraph (7), the light receiving means is configured with the electronic viewfinder that receives light split into the finder optical system, the electronic viewfinder can also be used as the light receiving means, and the component configuration can be simplified.

According to the invention described in the paragraph (8), condensed aperture reflected light can be received by the light receiving means, so that the light emission profile analysis at extremely low luminance can be performed.

According to the invention described in the paragraph (9), in the spectroscopic device, photometry and data acquisition for light emission profile analysis can be performed in parallel.

DESCRIPTION OF EMBODIMENTS

Hereinafter, embodiments of the present invention will be described with reference to the drawings.

Figure 1:
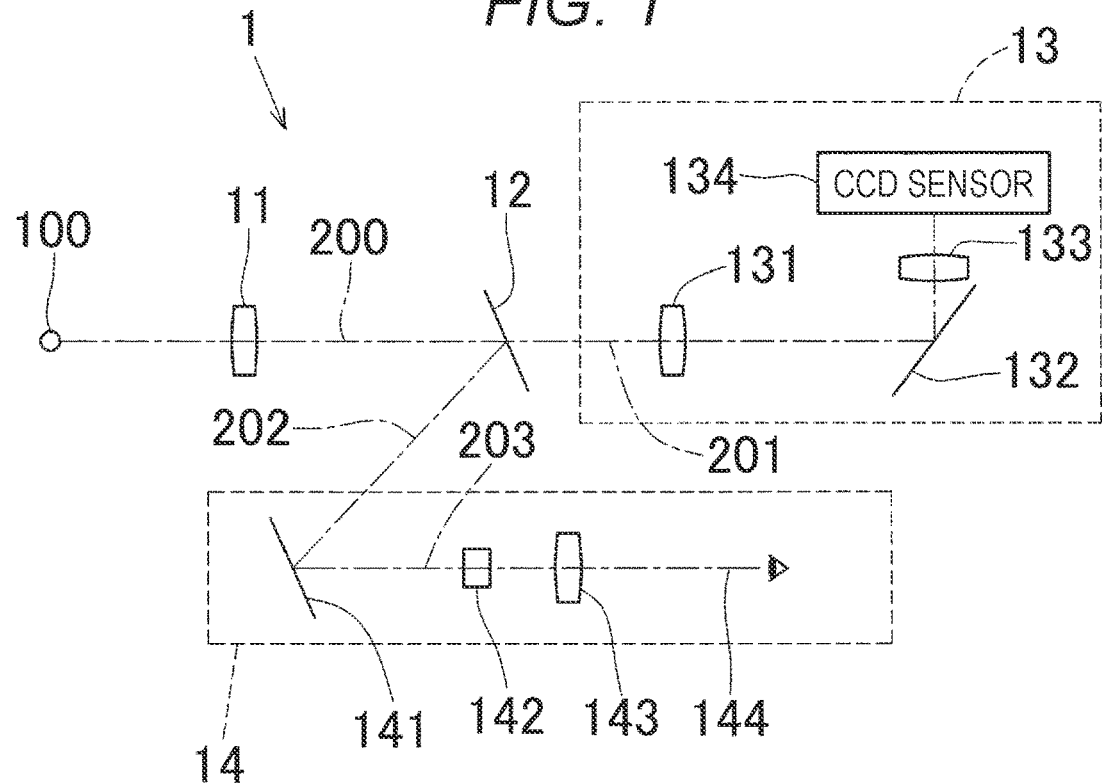
FIG. 1 is a configuration diagram of a photometer according to a first embodiment of the present invention.

FIG. 1 is a configuration diagram of a photometer 1 according to a first embodiment of the present invention. As illustrated in FIG. 1, the photometer 1 includes an objective lens 11 that condenses a luminous flux from an object to be measured 100, an aperture mirror (corresponding to a luminous flux splitting means) 12 arranged behind the objective lens 11 (in front of a luminous flux 200 in a traveling direction), a measurement optical system 11, and a finder optical system 14.

The aperture mirror 12 is a mirror having an opening that allows passing of the luminous flux 200 having passed through the objective lens 11. Of the luminous flux 200 having passed through the objective lens 11, a luminous flux 201 from a photometry area of the object to be measured 100 passes through the opening of the aperture mirror 12 and travels straight to the measurement optical system 13 in a subsequent stage. Whereas, a luminous flux outside the photometry area is reflected as a luminous flux 202 by the aperture mirror 12, passes through a lens group including a reflection mirror 141 and a relay lens 143 in the finder optical system 14, and is guided from a finder eyepiece unit 144 to a pupil of an observer. The observer visually recognizes the object to be measured 100 and an index circle (which is a region that is not reflected by the aperture mirror and appears black to the user) from the finder eyepiece unit 144, and performs measurement alignment and focusing.

The measurement optical system 13 includes: a condenser lens 131 that condenses the luminous flux 201 having passed through the opening of the aperture mirror 12; a diffraction grating 132 that disperses the luminous flux 201 having passed through the condenser lens 131; an image formation lens 133 arranged in front of (downstream of) the diffraction grating 132; and a CCD sensor (corresponding to a photometric means) 134 as a two-dimensional light receiving sensor that receives light diffracted by the diffraction grating 132 via the image formation lens 133. A configuration of such a measurement optical system 13 is known.

In this embodiment, a light receiving sensor (corresponding to a light receiving means) 142 is arranged at a position where a part of a luminous flux 203 can be received, on an optical path between the reflection mirror 141 and the relay lens 143 in the finder optical system 14. The light receiving sensor 142 is preferably arranged at a position deviated from a center of the index circle so as not to disturb observation in the index circle when the observer looks into the finder eyepiece unit 144.

In the first embodiment illustrated in FIG. 1, the condensed luminous flux 200 from the object to be measured 100 via the objective lens 11 is split into the luminous flux 201 directed to the measurement optical system 13 and the luminous flux 202 directed to the finder optical system 14 by the aperture mirror 12. The luminous flux 201 toward the measurement optical system 13 passes through the condenser lens 131, is then dispersed by the diffraction grating 132 for each frequency component, and is formed as an image on the CCD sensor 134 via the image formation lens 133. The CCD sensor 134 generates an output for each dispersed frequency component. On the basis of this output, a photometric value is obtained by an arithmetic device (not illustrated).

Whereas, the luminous flux 202 split into the finder optical system 14 by the aperture mirror 12 is reflected by the reflection mirror 141 in the finder optical system 14. Then, a part of the reflected luminous flux 203 is received by the light receiving sensor 142, and the remaining luminous flux 203 passes through the relay lens 143, reaches the finder eyepiece unit 144, and further reaches the pupil of the observer.

The light receiving sensor 142 generates an output according to a light reception result. This output is transmitted to a light emission profile analysis device (not illustrated) and used for analysis of a light emission profile including a light emission profile at an extremely low luminance.

Thus, in the first embodiment, the light receiving sensor 142 that generates an output for light emission profile analysis is arranged at a position for receiving at least a part of the luminous flux 203 that is split into the finder optical system 14 and is further reflected by the reflection mirror, and the light receiving sensor 142 is not arranged on an optical path split by the aperture mirror 12, incident on the measurement optical system 13, and guided to the CCD sensor 134. Therefore, it is possible to acquire data for light emission profile analysis by the light receiving sensor 142 without being affected by photometry by the CCD sensor 134. Therefore, photometry by the CCD sensor 134 and data acquisition for light emission profile analysis by the light receiving sensor 142 can be performed in parallel, which is efficient.

In addition, since light can be received by the light receiving sensor 142 by using aperture reflected light condensed by the aperture mirror 12, light emission profile analysis at extremely low luminance can be performed.

Figure 2:
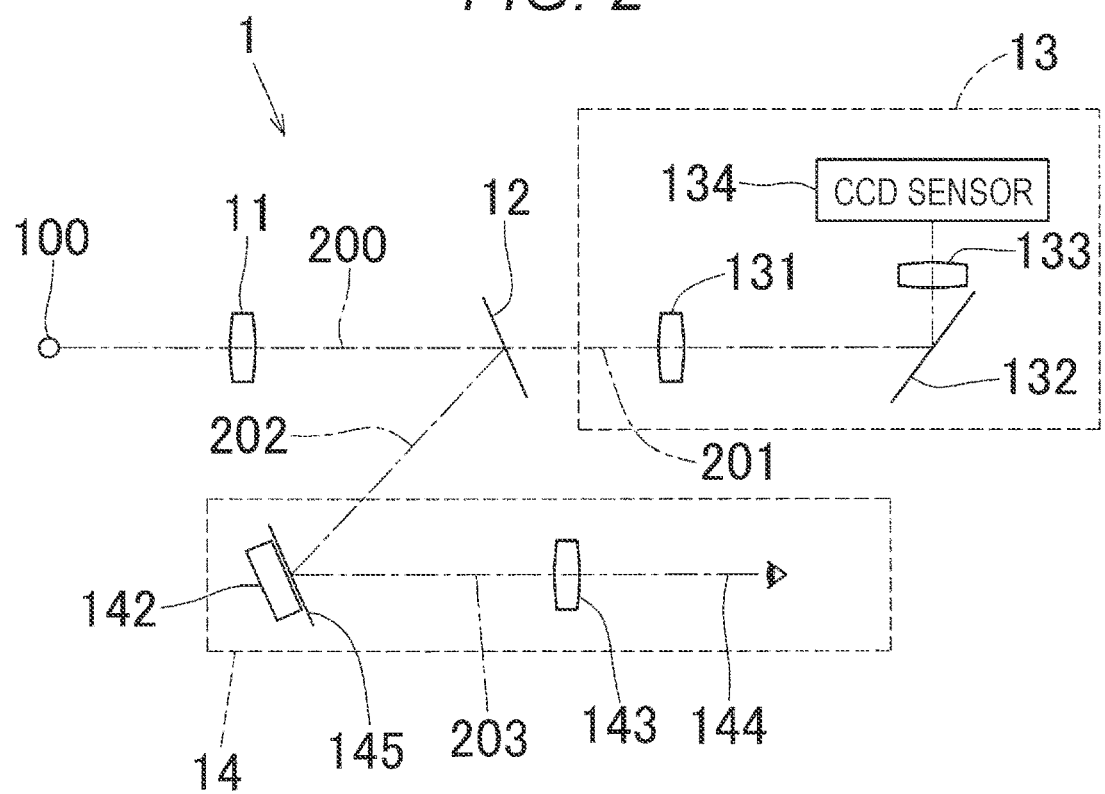
FIG. 2 is a configuration diagram of a photometer according to a second embodiment of the present invention.

FIG. 2 is a configuration diagram of a photometer 1 according to a second embodiment of the present invention. In this embodiment, an arrangement position and a light receiving mode of a light receiving sensor 142 in a finder optical system 14 are different from those of the first embodiment illustrated in FIG. 1.

Note that since configurations other than the finder optical system 14 are the same as those of the first embodiment illustrated in FIG. 1, the same components are denoted by the same reference numerals, and a detailed description thereof will be omitted.

In the second embodiment illustrated in FIG. 2, there is provided a half mirror 145 that transmits a part of a luminous flux 202 split into the finder optical system 14 by an aperture mirror 12 and to reflect remaining light. Further, the light receiving sensor 142 is arranged at a position opposite to the luminous flux 202 of the half mirror 145 so as to receive at least a part of the light transmitted by the half mirror 145. Further, a luminous flux 203 reflected by the half mirror 145 is guided to a finder eyepiece unit 144.

In the second embodiment illustrated in FIG. 2, the light receiving sensor 142 that generates an output for light emission profile analysis is arranged at a position for receiving at least a part of light split into the finder optical system 14 and transmitted through the half mirror 145, and the light receiving sensor 142 is not arranged on an optical path split by the aperture mirror 12, incident on a measurement optical system 13, and guided to a CCD sensor 134. Therefore, it is possible to acquire data for light emission profile analysis by the light receiving sensor 142 without being affected by photometry by the CCD sensor 134. Therefore, photometry by the CCD sensor 134 and data acquisition for light emission profile analysis by the light receiving sensor 142 can be performed in parallel, which is efficient.

Figure 3:
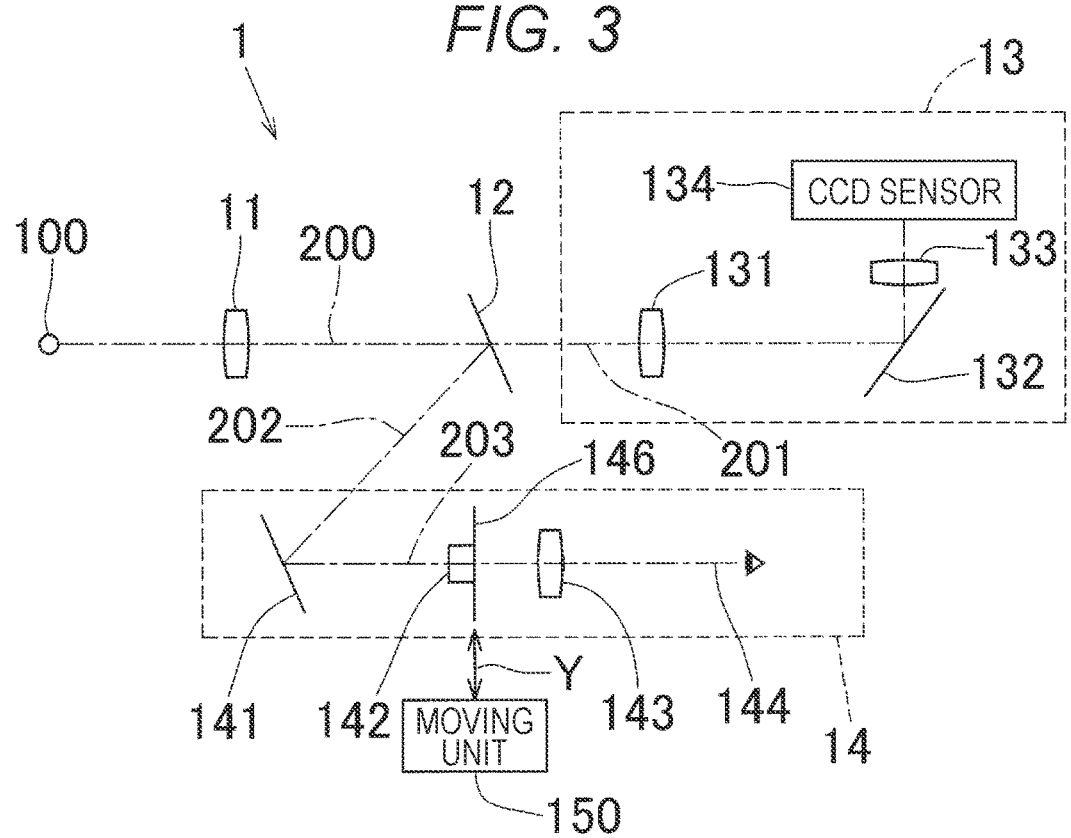
FIG. 3 is a configuration diagram of a photometer according to a third embodiment of the present invention.

FIG. 3 is a configuration diagram of a photometer 1 according to a third embodiment of the present invention. This embodiment is different from the first embodiment illustrated in FIG. 1 in that a shutter 146 is provided close to a light receiving sensor 142 in a finder optical system 14.

Note that since configurations other than the finder optical system 14 are the same as those of the first embodiment illustrated in FIG. 1, the same components are denoted by the same reference numerals, and a detailed description thereof will be omitted.

In the third embodiment illustrated in FIG. 3, similarly to the first embodiment of FIG. 1, the light receiving sensor 142 is arranged at a position where a part of a luminous flux 203 can be received, on an optical path between a reflection mirror 141 and a relay lens 143 in the finder optical system 14, but the shutter 146 is provided close to a front side of the light receiving sensor 142 in a traveling direction of the luminous flux. The shutter 146 is for blocking reverse incident light incident from a finder eyepiece unit 144 at a time of light reception by the light receiving sensor 142, in other words, at a time of outputting data for light emission profile analysis. For this reason, the shutter 146 is movable in a Y direction in FIG. 3 by a moving unit 150, and the moving unit 150 moves the shutter 146 to a position for blocking an optical path of the reverse incident light from the finder eyepiece unit 144 at a time of light reception by the light receiving sensor 142. After light reception by the light receiving sensor 142, the moving unit 150 moves the shutter 146 to a standby position in a lower part of FIG. 3 to be separated from the optical path.

In the third embodiment, a luminous flux 202 split into the finder optical system 14 by an aperture mirror 12 is reflected by the reflection mirror 141 in the finder optical system 14. Then, a part of the reflected luminous flux 203 is received by the light receiving sensor 142, and the remaining luminous flux 203 passes through the relay lens 143, is guided to the finder eyepiece unit 144, and further reaches a pupil of an observer.

At a time of light reception by the light receiving sensor 142, the shutter 146 having been on standby at the standby position is moved by the moving unit 150 to a blocking position of the reverse incident light from the finder eyepiece unit 144, and is moved to the standby position again after the tight reception by the light receiving sensor 142.

The light receiving sensor 142 receives light in a state where reverse incident light from the finder eyepiece unit 144 is blocked by the shutter 146, and generates an output according to a light reception result. This output is transmitted to a light emission profile analysis device (not illustrated) and used for analysis of a light emission profile including a light emission profile at an extremely low luminance.

As described above, in the third embodiment, the light receiving sensor 142 is arranged at a position for receiving a part of light that is split into the finder optical system 14 and reaches the finder eyepiece unit 144. Further, reverse incident light from the finder eyepiece unit 144 is blocked by the shutter 146 at a time of light reception by the light receiving sensor 142. Therefore, it is possible to reliably realize a configuration in which the light receiving sensor 142 is provided at a position for receiving at least a part of light split into the finder optical system 14, and photometry by a CCD sensor 134 and data acquisition for light emission profile analysis by the light receiving sensor 142 can be performed in parallel. In addition, at a time of light reception by the light receiving sensor 142, the shutter 146 can prevent an adverse effect of reverse incident light from the finder eyepiece unit 144.

Note that, in the third embodiment illustrated in FIG. 3, a configuration has been adopted in which the tight receiving sensor 142 is fixedly arranged, and the shutter 146 is moved between the position for blocking the reverse incident light from the finder eyepiece unit 144 and the standby position.

However, instead of this configuration, a configuration may, be adopted in which the shutter 146 is moved between the position for blocking reverse incident light from the finder eyepiece unit 144 and the standby position in a state where the light receiving sensor 142 is installed on the shutter 146 and both are integrated. In this case, by moving the shutter 146 installed with the light receiving sensor 142 to the position for blocking the reverse incident light in accordance with a photometry timing by the CCD sensor 134, an output for light emission profile analysis can be acquired from the light receiving sensor 142 in synchronization with photometry by the CCD sensor 134.

Furthermore, instead of moving the shutter 146, a configuration may be adopted in which an operable and closable window is provided in the shutter 146, the window is closed to block reverse incident light from the finder eyepiece unit 144 at a time of light reception by the light receiving sensor 142, and the window is opened except the time of light reception.

Figure 4:
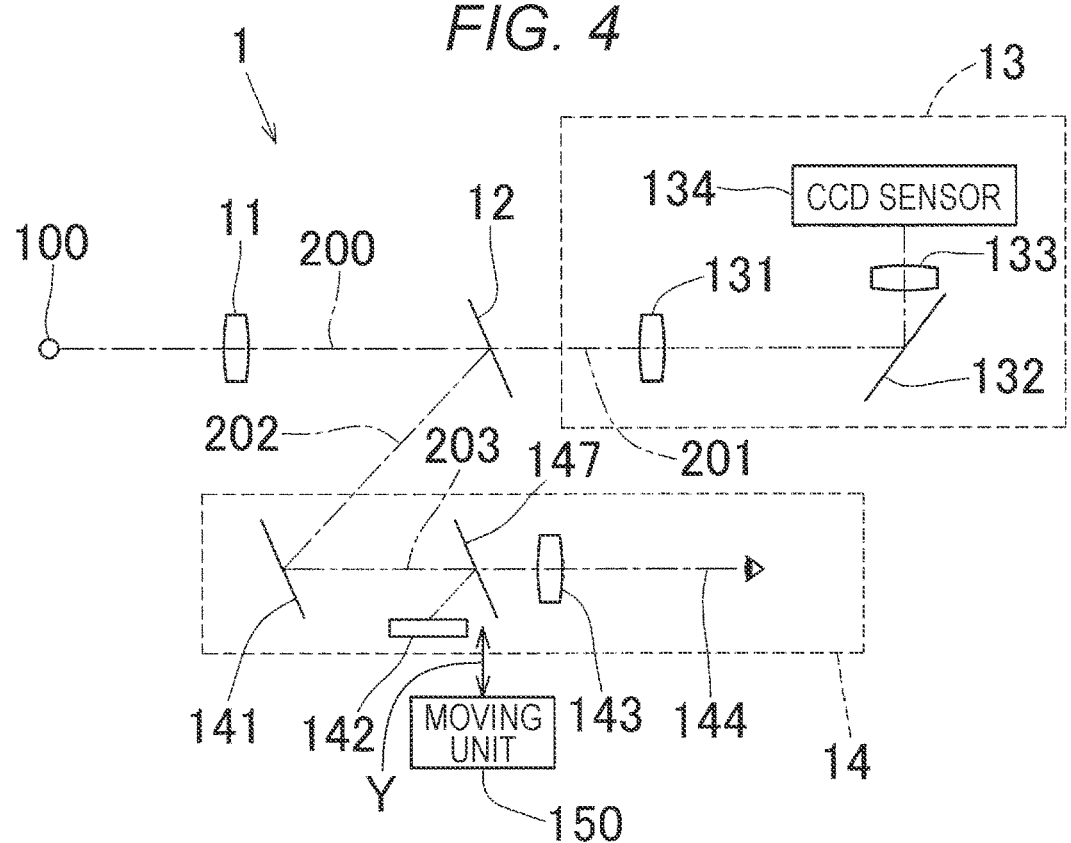
FIG. 4 is a configuration diagram of a photometer according to a fourth embodiment of the present invention.

FIG. 4 is a configuration diagram of a photometer 1 according to a fourth embodiment of the present invention. In the third embodiment illustrated in FIG. 3, the configuration has been adopted in which the shutter 146 is moved in the Y direction by the moving unit 150. However, in the fourth embodiment, a light guide mirror 147 is configured to be movable in a Y direction by a moving unit 150, and an arrangement position of a light receiving sensor 142 is different from that of the third embodiment in FIG. 3.

Note that since configurations other than a finder optical system 14 are the same as those of the first embodiment illustrated in FIG. 1, the same components are denoted by the same reference numerals, and a detailed description thereof will be omitted.

At a time of light reception by the light receiving sensor 142, in other words, at a time of outputting data for light emission profile analysis, the light guide mirror 147 plays a role of reflecting at least a part of a luminous flux 203 that is split into the finder optical system 14 by an aperture mirror 12, is reflected by a reflection mirror 141, and reaches a finder eyepiece unit 144, and of blocking reverse incident light from the finder eyepiece unit 144. Therefore, the light guide mirror 147 is adapted to be movable in the Y direction of FIG. 4 by the moving unit 150 in a state of being inclined obliquely downward with respect to the luminous flux 203 reflected by the reflection mirror 141 and reaching the finder eyepiece unit 144. Then, at a time of light reception by the light receiving sensor 142, the moving unit 150 moves the light guide mirror 147 while being inclined to a reflection/blocking position illustrated in FIG. 4 for reflecting at least a part of the luminous flux 203 that reaches the finder eyepiece unit 144 and for blocking reverse incident light from the finder eyepiece unit 144. After the light reception by the light receiving sensor 142, the moving unit 150 moves the light guide mirror 147 to a standby position in a lower part of FIG. 4 to be separated from the optical path.

The light receiving sensor 142 is arranged at a position for receiving at least a part of the luminous flux reflected obliquely downward by the light guide mirror 147 moved to the reflection/blocking position.

In the fourth embodiment, a luminous flux 202 split into the finder optical system 14 by the aperture mirror 12 is reflected by the reflection mirror 141 in the finder optical system 14, is guided to the finder eyepiece unit 144, and further reaches a pupil of an observer.

At a time of light reception by the light receiving sensor 1142, the light guide mirror 147 having been on standby at the standby position is moved to the above-described reflection/blocking position by the moving unit 150, and is moved to the standby position again after the light reception by the light receiving sensor 142. In this case, by moving the light guide mirror 147 to the reflection/blocking position in accordance with a photometry timing by a CCD sensor 134, an output for light emission profile analysis can be acquired from the light receiving sensor 142 in synchronization with photometry by the CCD sensor 134.

The luminous flux 203 is reflected by the light guide mirror 147 moved to the reflection/blocking position, and the light receiving sensor 142 receives at least a part of the reflected light and generates an output according to a light reception result. This output is transmitted to a light emission profile analysis device (not illustrated) and used for analysis of a light emission profile including a light emission profile at an extremely low luminance. In addition, the light guide mirror 147 moved to the reflection/blocking position blocks reverse incident light from the finder eyepiece unit 144 at a time of light reception by the light receiving sensor 142.

As described above, in the fourth embodiment, at a time of light reception by the light receiving sensor 142, the light guide mirror 147 moves from the standby position to the reflection/blocking position for reflecting at least a part of the luminous flux 203 that is split into the finder optical system 14 and reaches the finder eyepiece unit 144 and for blocking reverse incident light from the finder eyepiece unit 144, and the light receiving sensor 142 receives at least a part of the light reflected by the light guide mirror 147. Therefore, with the light guide mirror 147, it is possible to generate an output for light emission profile analysis from the light receiving sensor 142 while blocking reverse incident light from the finder eyepiece unit 144 and preventing adverse effects thereof.

Figure 5:
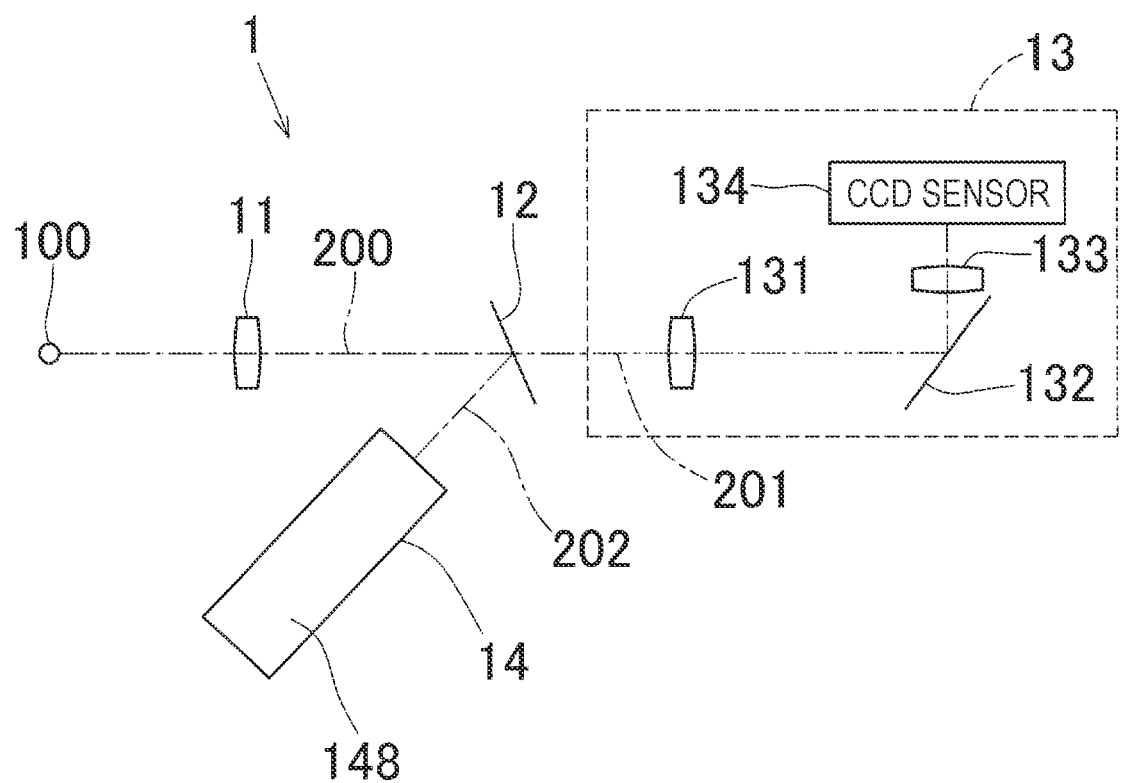
FIG. 5 is a configuration diagram of a photometer according to a fifth embodiment of the present invention.

FIG. 5 is a configuration diagram of a photometer 1 according to a fifth embodiment of the present invention. This embodiment is different from the first embodiment illustrated in FIG. 1 in that an electronic viewfinder 148 is provided in a finder optical system 14.

Note that since configurations other than the finder optical system 14 are the same as those of the first embodiment illustrated in FIG. 1, the same components are denoted by the same reference numerals, and a detailed description thereof will be omitted.

In the fifth embodiment illustrated in FIG. 5, a luminous flux 202 split into the finder optical system 14 by an aperture mirror 12 is directly incident on the electronic viewfinder 148, and an observer observes an object to be measured 100 and the like on a screen of the electronic viewfinder 148.

Further, the electronic viewfinder 148 is also used as a light receiving sensor that generates an output for light emission profile analysis. At a time of light reception by the light receiving sensor, an output of the electronic viewfinder 148 is acquired as it is and used as an output for light emission profile analysis.

As described above, in the fifth embodiment, since the electronic viewfinder 148 that receives the luminous flux 202 split into the finder optical system 14 is also used as the light receiving sensor, a component configuration can be simplified.

Although embodiments of the present invention have been described above, the present invention is not limited to the embodiments described above. For example, a case has been described in which the photometer 1 is a spectroscopic device, that is, a case of a form has been described in which the measurement optical system 13 performs photometry by the CCD sensor 134 in a state where the luminous flux 201 having passed through the condenser lens 131 is dispersed by the diffraction grating 132, but a photometer that performs photometry without dispersing light may be adopted.

This application claims the priority of Japanese Patent Application No. 2020131729 filed on Aug. 3, 2020, the contents of the disclosure of which are incorporated herein as they are.

INDUSTRIAL APPLICABILITY

The present invention can be used as a photometer capable of performing data acquisition for light emission profile analysis and photometry in parallel.

REFERENCE SIGNS LIST

1 photometer
11 objective lens
12 aperture mirror
13 measurement optical system
14 finder optical system
100 object to be measured
132 diffraction grating
134 CCD sensor (photometric means)
141 reflection mirror
142 light receiving sensor (light receiving means)
144 finder eyepiece unit
145 half mirror
146 shutter
147 light guide mirror
148 electronic viewfinder
150 moving unit

The invention claimed is:

1. A photometer comprising a luminous flux splitter that splits a luminous flux incident from a single light receiving optical system and guides the luminous flux to a finder optical system and a photometric part, the photometer comprising:
a light receiver that is arranged at a position to receive at least a part of light split into the finder optical system by the luminous flux splitter and generates an output for light emission profile analysis according to a light reception result,
wherein:
the light receiver is arranged at a position to receive at least a part of the light that is split into the finder optical system by the luminous flux splitter and reaches a finder eyepiece, and
a shutter blocks reverse incident light from the finder eyepiece at a time of light reception by the light receiver.

2. The photometer according to claim 1, wherein:
the light receiver is installed on the shutter, and
a mover is configured to move the shutter to a position for blocking the reverse incident light in accordance with a photometry timing by the photometric part.

3. The photometer according to claim 2, wherein the luminous flux splitter is an aperture mirror having an aperture at a center.

4. The photometer according to claim 2, wherein the photometer is a spectroscopic device.

5. The photometer according to claim 1, wherein the luminous flux splitter is an aperture mirror having an aperture at a center.

6. The photometer according to claim 1, wherein the photometer is a spectroscopic device.

7. A photometer comprising a luminous flux splitter that splits a luminous flux incident from a single light receiving optical system and guides the luminous flux to a finder optical system and a photometric part, the photometer comprising:
a light receiver that is arranged at a position to receive at least a part of light split into the finder optical system by the luminous flux splitter and generates an output for light emission profile analysis according to a light reception result;
a light guide mirror that is movable between a reflection/blocking position and a standby position, the reflection/blocking position being for reflecting at least a part of the light that is split into the finder optical system by the luminous flux splitter and reaches a finder eyepiece and for blocking reverse incident light from the finder eyepiece; and
a mover that moves the light guide mirror from the standby position to the reflection/blocking position at a time of light reception by the light receiver,
wherein the light receiver is arranged at a position to receive at least a part of light reflected by the light guide mirror moved to the reflection/blocking position.

8. The photometer according to claim 7, wherein the mover moves the light guide mirror to the reflection/blocking position in accordance with a photometry timing by the photometric part.

9. The photometer according to claim 8, wherein the luminous flux splitter is an aperture mirror having an aperture at a center.

10. The photometer according to claim 8, wherein the photometer is a spectroscopic device.

11. The photometer according to claim 7, wherein the luminous flux splitter is an aperture mirror having an aperture at a center.

12. The photometer according to claim 7, wherein the photometer is a spectroscopic device.

13. A photometer comprising a luminous flux splitter that splits a luminous flux incident from a single light receiving optical system and guides the luminous flux to a finder optical system and a photometric part, the photometer comprising:
a light receiver that is arranged at a position to receive at least a part of light split into the finder optical system by the luminous flux splitter and generates an output for light emission profile analysis according to a light reception result; and
a half mirror that transmits a part of the light split into the finder optical system by the luminous flux splitter and reflects remaining light to a finder eyepiece,
wherein:
the light receiver is arranged at a position to receive at least a part of light transmitted by the half mirror, and
the luminous flux splitter is an aperture mirror having an aperture at a center.

14. The photometer according to claim 13, wherein the photometer is a spectroscopic device.

15. A photometer comprising a luminous flux splitter that splits a luminous flux incident from a single light receiving optical system and guides the luminous flux to a finder optical system and a photometric part, the photometer comprising:
a light receiver that is arranged at a position to receive at least a part of light split into the finder optical system by the luminous flux splitter and generates an output for light emission profile analysis according to a light reception result; and an electronic viewfinder that receives the light split into the finder optical system by the luminous flux splitter, wherein:

the light receiver is configured with the electronic viewfinder, and the luminous flux splitter is an aperture mirror having an aperture at a center.

* * * * *